US005140067A

United States Patent [19]

Tsuneshige et al.

[11] Patent Number: 5,140,067

[45] Date of Patent: Aug. 18, 1992

[54] HEAT RESISTANT AND IMPACT RESISTANT RESIN COMPOSITION

[75] Inventors: Yasunori Tsuneshige; Atsushi Kimura; Yutaka Toyooka, all of Ohtake; Katsutoshi Kajimura, Tokyo, all of Japan

[73] Assignee: Mitsubishi Rayon Company Limited, Tokyo, Japan

[21] Appl. No.: 429,378

[22] Filed: Oct. 31, 1989

[30] Foreign Application Priority Data

Oct. 31, 1988 [JP] Japan ............................... 63-275291

[51] Int. Cl.[5] ...................... C08L 39/04; C08L 55/02; C08L 25/12

[52] U.S. Cl. ......................................... 525/73; 525/86

[58] Field of Search .......................................... 525/73

[56] References Cited

U.S. PATENT DOCUMENTS 4,877,833 10/1989 Kondo ................................ 525/73

FOREIGN PATENT DOCUMENTS 204548 12/1986 European Pat. Off. .
58-162616 9/1983 Japan .
60-79019 5/1985 Japan .
073755 4/1986 Japan .................................... 525/73
101547 5/1986 Japan .................................... 525/73
171708 8/1986 Japan .
61-276807 12/1986 Japan .

*Primary Examiner*—John C. Bleutge
*Assistant Examiner*—David Buttner
*Attorney, Agent, or Firm*—Cushman, Darby & Cushman

[57] ABSTRACT

A heat resistant and impact resistant resin composition is disclosed which composition comprises 5 to 95 parts by weight of a maleimide copolymer (A) prepared by continuous polymerization in the absence of water, containing only small amounts of residual monomers and volatile components, and having a Mw/Mn of not greater than 3, a yellow index of not greater than 30, and an intrinsic viscosity of 0.3 to 1.5, and 5 to 95 parts by weight of a rubber-reinforced resin (B).

4 Claims, 1 Drawing Sheet

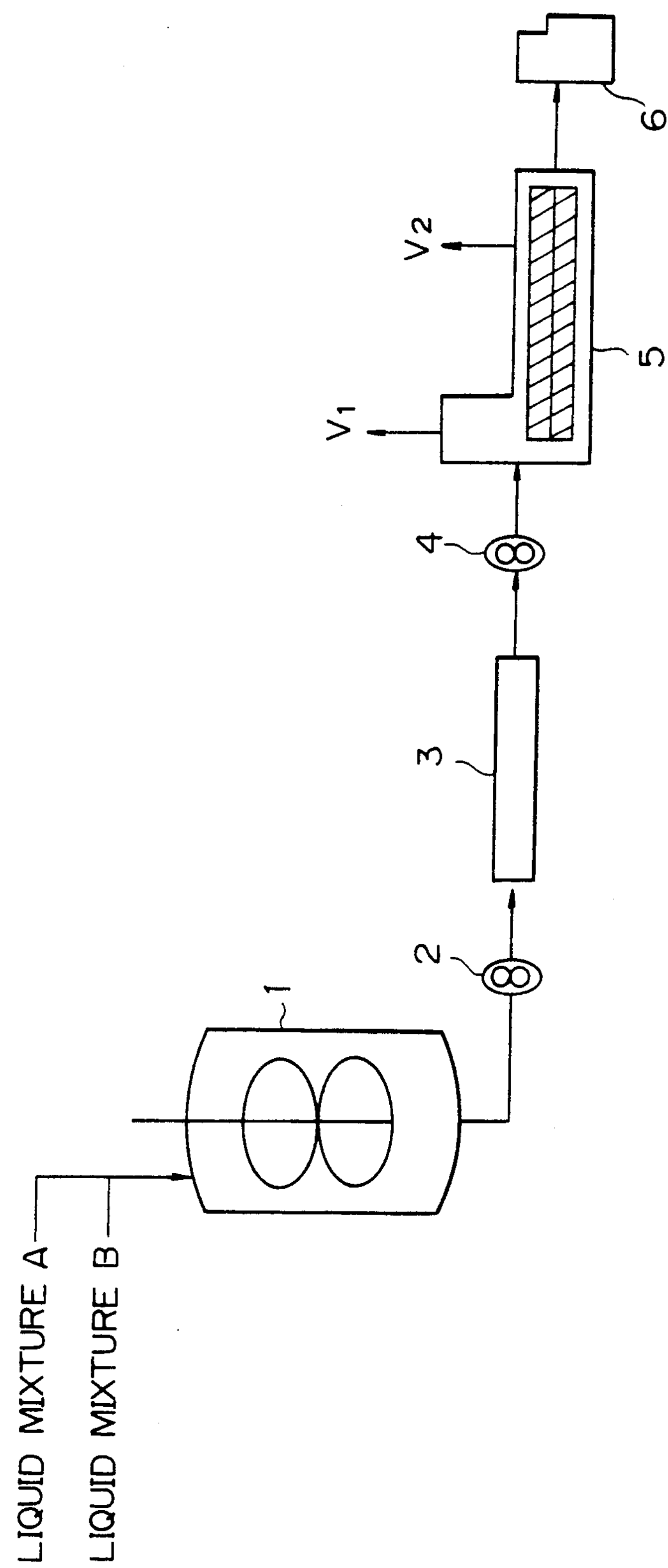
LIQUID MIXTURE A
LIQUID MIXTURE B
1
2
3
4
5
6
V1
V2

HEAT RESISTANT AND IMPACT RESISTANT RESIN COMPOSITION

BACKGROUND OF THE INVENTION

1. Field of the Invention

The present invention relates to a resin composition which is excellent in heat resistance and impact resistance. Also, the present invention relates to a resin composition which is hard to get decomposed by heat and less suffering from coloring during molding operation.

2. Description of the Prior Art

Heat resistant ABS resins, modified polyphenylene ether resins and polycarbonate resins have been employed in the fields requiring heat resistance.

Heat resistant ABS resins have been produced by a so-called graft blending process in which a graft ABS resin prepared by polymerizing acrylonitrile, and styrene and/or α-methylstyrene in the presence of a butadiene rubber is blended with a matrix resin such as a ter-polymer of acrylonitrile-styrene-α-methylstyrene or a quadri-polymer of acrylonitrile-styrene-α-methylstyrene-N-phenyl maleimide. In these cases, use of α-methylstyrene involves drawbacks that the rate of polymerization is slow and preparation of a copolymer with a high degree of polymerization is difficult, as well as that the copolymer is easily decomposed by heat at the time of processing since a structure of repeated α-methylstyrene chains is formed in the copolymer. Further, a maleimide copolymer is disclosed in Laid-Open Japanese Patent Applications Tokkai-Sho 58-162616, 60-79019 and 61-276807. The copolymer using N-phenyl maleimide is often prepared by emulsion polymerization but such copolymer is not preferred since the development of impact resistance is poor due to the effect of an emulsifier remained in the copolymer and coloration of the copolymer is remarkable during molding operation.

On the other hand, modified polyphenylene ether resins, polycarbonate resins and modified polycarbonate resins have drawback that they are generally expensive and poor in moldability.

In the case of preparing a highly heat resistant copolymer using maleimide monomer, although the use of maleimide monomer by more than a certain amount is necessary, if the maleimide content in the copolymer is increased excessively, the resultant copolymer is poor both in the impact resistance and fluidity. Accordingly, monomer composition to be charged to a polymerization reactor has to be adjusted within a certain range. In addition, since the maleimide monomer shows much higher rate of polymerization and tends to cause homopolymerization, the molecular weight distribution or the distribution of chemical composition in the copolymer becomes broader tending to worsen the physical property such as the impact resistance of the copolymer. Further, if unreacted maleimide monomer is present in the copolymer, transparency of the copolymer is reduced and its coloration is remarkable. In view of the above, sufficient consideration has to be taken for polymerization process and subsequent devolatization of the unreacted monomer and organic solvent.

As the results of the research and development of such copolymers it has been found that a resin composition having an excellent heat resistance and impact resistance can be prepared by continuously polymerizing a maleimide monomer with other monomers at a specific ratio in the presence of a predetermined amount of an organic solvent by a specific method, devolatizing unreacted monomers and the organic solvent in a devolatizing device and then blending the resultant maleimide copolymer with a specific rubber-reinforced resin.

SUMMARY OF THE INVENTION

The present invention is to provide a heat resistant and impact resistant resin composition comprising from 5 to 95 parts by weight of a maleimide copolymer (A), from 5 to 95 parts by weight of a rubber-reinforced resin (B) and from 0 to 300 parts by weight of a rigid thermoplastic resin (C) other than (A) and (B) based on 100 parts by weight of the total amount of (A) and (B);

the maleimide copolymer (A) comprises more than 28% by weight and not more than 65% by weight of a maleimide monomer unit (a), not less than 16% by weight and less than 72% by weight of at least one monomer unit (b) selected from the group consisting of aromatic vinyl compounds and methacrylic acid esters and from 0 to 25% by weight of other vinyl monomer unit (c) (in which the total amount of the monomer units (a)-(c) is 100% by weight), wherein (i) the content of residual maleimide monomer in said copolymer is not greater than 0.1% by weight and the total,volatile component other than the maleimide monomer in said copolymer is not greater than 0.5% by weight, (ii) the ratio Mw/Mn of the weight average molecular weight Mw of said copolymer and the number average molecular weight Mn of said copolymer is not greater than 3, (iii) the yellow index of said copolymer is not greater than 30, and (iv) the intrinsic viscosity of said copolymer is from 0.3 to 1.5; and the rubber-reinforced resin (B) is prepared by polymerizing at least one monomer selected from the group consisting of vinyl cyanide compounds, aromatic vinyl compounds and alkyl (meth)acrylates with 1 to 8 carbon atoms in the alkyl group under the presence of a butadiene rubber.

BRIEF DESCRIPTION OF THE DRAWING

The accompanying drawing shows an example of an apparatus for producing a maleimide copolymer of the present invention. In the drawing are shown first polymerization reactor (stirred tank reactor) 1, gear pump 2 and 4, second polymerization reactor 3, an devolatizing extruder 5 and pelletizer 6.

DETAILED DESCRIPTION OF THE PREFERRED EMBODIMENTS

The maleimide monomer (a) constituting the maleimide copolymer (A) used in the present invention is represented by the following general formula (I):

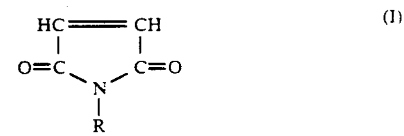

(I)

where R represents hydrogen, alkyl group with 1 to 4 carbon atoms, cyclohexyl group, aryl group or substituted aryl groups.

Exemplary maleimide monomers that can be employed in the present invention are maleimide, N-methylmaleimide, N-ethylmaleimide, N-propylmaleimide, N-isopropylmaleimide, N-cyclohexylmaleimide, N-phenylmaleimide, N-toluylmaleimide, N-xylylmaleimide, N-naphthylmaleimide, N-t-butylmaleimide, N-ortho-chlorophenylmaleimide and N-ortho-methoxyphenylmaleimide. Among them, N-cyclohexylmaleimide, N-phenylmaleimide, N-toluylmaleimide, N-ortho-chlorophenylmaleimide and N-ortho-methoxyphenylmaleimide are preferred, with N-cyclohexylmaleimide and phenylmaleimide being particularly preferred. These maleimide monomers can be used alone or as a combination of two or more of them.

The content of the maleimide monomer unit (a) in the maleimide copolymer (A) has to be within a range of more than 28% by weight and not more than 65% by weight, preferably, within a range of more than 28% by weight and not more than 55% by weight. If the content is not more than 28% by weight, the maleimide copolymer shows poor heat resistance and the resin composition prepared by blending it with the rubber-reinforced resin and, optionally, other rigid thermoplastic resin shows low heat resistance. On the other hand, if the content exceeds 65% by weight, the maleimide copolymer shows poor impact resistance and fluidity and, thus, the final resin composition obtained shows poor impact resistance and fluidity.

Exemplary aromatic vinyl compound (b) that can be a component of the maleimide copolymer (A) are styrene, $\alpha$-methylstyrene, t-butylstyrene, chlorostyrene and vinyltoluene, with styrene and $\alpha$-methylstyrene being preferred. These aromatic vinyl monomers can be used alone or as a combination of two or more of them.

Further, as the methacrylic acid ester (b) capable of constituting the maleimide copolymer (A), there can be mentioned methyl methacrylate, ethyl methacrylate, propyl methacrylate, butyl methacryalate, phenyl methacrylate, isobornyl methacrylate, benzyl methacrylate and trifluoroethyl methacrylate, with methyl methacrylate being preferred. These methacrylic acid esters can be used alone or as a combination of two or more of them.

In the present invention, at least one monomer selected from the group consisting of the aromatic vinyl compounds and the methacrylic acid esters is used as the component (b) for the maleimide copolymer (A) and it is necessary that the content of at least one monomer unit (b) in the maleimide copolymer (A) is within a range of not less than 16% by weight and less than 72% by weight, preferably, within a range of not less than 29% by weight and less than 72% by weight. If the content is less than 16% by weight, the maleimide copolymer shows poor moldability and the finally obtained resin composition also shows poor moldability. On the other hand, if it is not less than 72% by weight, the content of the maleimide monomer unit is reduced to not more than 28% by weight, and thus the heat resistance of the resultant maleimide copolymer lowers and the finally obtained resin composition shows poor heat resistance in turn.

Furthermore, exemplary other vinyl monomer (c) that can be used as optional component constituting the maleimide copolymer (A) are vinyl cyanides, acrylic acid esters, unsaturated dicarboxylic acid anhydrides and vinyl carboxylic acids. As the vinyl cyanide, there can be mentioned acrylonitrile, methacrylonitrile and fumaronitrile with acrylonitrile being preferred. Further, as the acrylic acid ester, there can be mentioned methyl acrylate, ethyl acrylate, propyl acrylate, butyl acrylate, and cyclohexyl acrylate. Further, as the unsaturated dicarboxylic acid anhydride, there can be mentioned anhydride of maleic acid, itaconic acid and citraconic acid, with maleic acid anhydride being preferred. Furthermore, as the vinyl carboxylic acid, there can be mentioned acrylic acid and methacrylic acid. Acrylonitrile, maleic acid anhydride and methacrylic acid are used preferably. These other vinyl monomers (c) can be used alone or as a combination of two or more of them, but they are not always necessary to be used.

The content of the unit (c) based on the other vinyl monomers in the maleimide copolymer (A) is within a range from 0 to 25% by weight, preferably, from 0 to 19% by weight and, more preferably, from 0 to 16% by weight. If the content exceeds 25% by weight, resultant maleimide copolymer has properties which do not achieve the purpose of the present invention.

The maleimide copolymer (A) is controlled such that the total amount for the content of the maleimide monomer unit (a), at least one monomer unit (b) selected from the group consisting of aromatic vinyl compounds and methacrylic acid esters, and other vinyl monomer unit (c) becomes 100% by weight.

Further, it is necessary for the maleimide copolymer (A) used in the present invention that the content of the residual maleimide monomer in the copolymer is not greater than 0.1% by weight, preferably, not greater than 0.05% by weight and the total volatile content other than the maleimide monomer is not greater than 0.5% by weight, preferably, not greater than 0.4% by weight. The content of the residual maleimide monomer in excess of 0.1% by weight is not preferred since this causes drawbacks in that the copolymer often shows remarkable coloration and thus poor transparency, as well as causes poor weather proofness and easy coloration by heating. Furthermore, it may possibly cause bleedout on molding the resin composition obtained by using the copolymer, failing to obtain satisfactory moldings. Further, as the total volatile component other than the maleimide monomer, there can be mentioned monomer of other components of the maleimide copolymer (A) and the organic solvent. If they are present in an amount in excess of 0.5% by weight, the maleimide copolymer (A) shows poor heat resistance and silver streaks are developed on molding the resin composition from the copolymer at a high temperature, failing to obtain satisfactory moldings.

It is further necessary for the maleimide compolymer (A) that it has a ratio Mw/Mn between the weight average molecular weight Mw and the number average molecular weight Mn of not greater than 3, preferably, not greater than 2.8 and, more preferably, not greater than 2.5. The ratio Mw/Mn is generally used as a measure for the extent of the molecular weight distribution. If the value is not less than 3, since the maleimide copolymer shows poor impact resistance or poor transparency, the final resin composition also shows poor impact resistance and poor transparency. The weight average molecular weight Mw and the number average molecular weight Mn can be measured by determining an extraction curve according to gel permeation chromatography (GPC) and converting it into that for a standard polystyrene.

Furthermore, it is necessary that the maleimide copolymer (A) has a yellow index (Yellowness YI) of not greater than 30, preferably, not greater than 25. The yellow index in the present invention indicates a value measured for a plate molded by using the resultant maleimide copolymer or resin composition and has a close relationship with the amount of residual maleimide monomer in the maleimide copolymer. Also, the yellow index has a close relationship with the residual amount of monomer in a case of using a vinyl cyanide as other vinyl monomer. When the yellow index exceeds 30, the maleimide copolymer has a broad distribution of its chemical composition and contains fundamental factors in its structure tending to cause coloration of the copolymer on molding and, thus, shows poor transparency. Such copolymer has poor impact resistance. Therefore, a resin composition finally obtained also shows poor impact resistance and transparency.

It is further necessary for the maleimide copolymer (A) that it has an intrinsic viscosity within a range from 0.3 to 1.5, preferably, from 0.5 to 1.2. The value of the intrinsic viscosity is determined by dissolving the maleimide copolymer in N,N-dimethylformamide and measuring at 25° C. by a Ubbellohde's viscometer. The impact resistance of the maleimide polymer is low if the intrinsic viscosity is not greater than 0.3, whereas a maleimide copolymer with the intrinsic viscosity in excess of 1.5 shows poor fluidity although it has a high impact resistance and, as a result, the molding of the final resin composition is difficult.

It is necessary that the maleimide copolymer (A) used in the present invention can satisfies all of the foregoing conditions such as residual amount of maleimide monomer, total volatile content other than that of the maleimide monomer, Mw/Mn ratio, yellow index and intrinsic viscosity.

The process for producing the maleimide copolymer (A) used in the present invention is a bulk polymerization in principle. However, addition of an organic solvent into the reaction system is necessary. Since polymerization rate (monomer reactivity ratio) of the monomers is different from each other, it is necessary for preparing the maleimide copolymer (A) in practical operation to continue the copolymerization by continuously supplying a monomer mixture containing from 78 to 50% by weight of a maleimide monomer, from 40 to 90% by weight of at least one monomer selected from the group consisting of aromatic vinyl compounds and methacylic acid esters, optionally, from 0 to 35% by weight of other vinyl monomer (total amount of the monomers are 100% by weight), an organic solvent and, otionally, a polymerization initiator dropwise to a stirred tank reactor such that the weight ratio of the monomer mixture and the organic solvent is within a range from 3:2 to 9:1. In a case where the amount of the solvent is less than that explained above, the viscosity of the reaction system is increased during polymerization to make the stirring difficult and, in addition, recovery of the product of the polymerization reaction from a reactor becomes difficult. In addition, if the viscosity is increased, heat conduction becomes insufficient to make the temperature not uniform in the reaction system thereby leading to widening of the molecular weight distribution and widening of the distribution of chemical composition. On the other hand, in a case where the amount of the organic solvent is greater as compared with that of the monomer, the rate of polymerization is slow and, in addition, devolatization of the organic solvent in the devolatization step becomes difficult to worsen the productivity.

It is necessary for the organic solvent that it neither polymerizes by itself nor hinders the polymerization of the monomer, and is capable of dissolving the maleimide copolymer (A) described above. Exemplary organic solvents are methyl ethyl ketone, diethyl ketone, methyl isobutyl ketone, acetophenone, benzene, toluene, ethyl-benzene, xylene, tetrahydrofuran and N,N-dimethylformamide.

Further, when polymerizing the maleimide in the present invention, a polymerization initiator can be added if required. As the polymerization initiator, those generally known organic peroxides and azo compounds can be used. As the organic peroxide, there may be used ketone peroxides, peroxyketals, hydroperoxides, dialkylperoxides, diacylperoxides, peroxyesters and peroxydicarbonates, with those having the half reduction temperature of 10 hours at a temperature from 80° to 140° C. being preferred. Specific examples for the organic peroxides can include, for example, methyl ethyl ketone peroxide, methyl isobutyl ketone peroxide, methylcyclohexanone peroxide, acetylacetone peroxide, 1,1-dibutylperoxy-3,3,5-trimethylcyclohexane, 1,1-dibutylperoxycyclohexane, 2,2-di-t-butylperoxybutane, 2,2,4-trimethylpentyl-2-hydroperoxide, dicumylperoxide, 2,5-dimethyl-2,5-di-(t-butylperoxy)hexane, t-butylcumylperoxide, di-t-butylperoxide, tris-(t-butylperoxy)-triazine, di-t-butylperoxyhexahydro terephthalate, di-t-butylperoxyazelate, t-butylperoxy acetate, t-butylperoxy benzoate, t-butylperoxy laurate and t-butylperoxyisopropyl carbonate. As specific examples of the azo compound, there can be mentioned 1,1′-azobis(cyclohexane-1-carbonitrile), 2-phenylazo-4-methoxy-2,4-dimethyl varelonitrile and 2,2′-azobis(2,4,4-trimethylpentane).

The process for preparing the maleimide copolymer (A) is a so-called continuous polymerization, which comprises continuously conducting polymerization reaction under a specified range of the weight ratio between the monomer and the organic solvent as described above and, subsequently, continuously recovering the product of polymerization reaction from the reaction system and, at the same time, continuously supplying the monomer and the organic solvent to the reaction system, thereby making it possible to produce a maleimide copolymer with narrow distribution in molecular weight and chemical composition.

It is important to continuously supply the monomer and the organic solvent at a weight ratio within a range from 3:2 to 9:1 dropwise into a stirred tank reactor thereby continuously conducting the polymerization reaction and continuously recovering the product of polymerization containing copolymer, unreacted monomer and organic solvent from the reactor so as to always keep the predetermined monomer composition and concentration of the copolymer and, if desired, concentration of the polymerization initiator in the polymerization system, at a conversion ratio of the total monomers charged in the reaction system to the copolymer (referred to as "conversion ratio" hereinafter) within a range from 30 to 70%, thereby continuing the polymerization under stationary conditions. If the product is recovered at the conversion ratio of not greater than 30%, the removal of the unreacted monomer and the organic solvent in the devolatizing device described later becomes difficult. On the other hand, if the polymerization is conducted in a state where the conversion ratio exceeds 70%, the viscosity of the reaction system is increased to make the stirring difficult and also make the continuous recovery of the product of polymerization difficult. In addition, since temperature distribution is caused in the polymerization reactor, this results in a copolymer of wide distribution in the molecular weight and chemical composition to deteriorate the impact resistance and the transparency.

In the production of the maleimide copolymer (A), the product recovered from the polymerization reactor is further processed in a static mixer type second polymerization reactor disposed, as required, to polymerize at least a part of unreacted maleimide monomer as well as other unreacted monomers and, subsequently, the resultant product is transferred to a devolatizing device to devolatize the unreacted monomer and organic solvent under the condition of reduced pressure. The conversion ratio can be increased further in the second polymerization reactor, while it is not desirable to enhance the conversion ratio excessively in the second polymerization reactor to which additional monomers are not supplied, since it causes unevenness in the distribution in the molecular weight and chemical composition. In this connection, it is a fact that unreacted maleimide monomer in the product from the polymerization reactor has t be polymerized before reaching the succeeding devolatizing step. If devolatization is applied in a state where the unreacted maleimide monomer is present, the resultant maleimide copolymer is undesirably colored remarkably.

As a devolatizing device, there may be preferably used a multi-vent-devolatizing extruder, flash type evaporizing device and thin film evaporizing device. An apparatus having a plurality of such devices may also be used.

By passing through the various processes as described above, resultant maleimide copolymer is made such that the content of the residual maleimide monomer is not greater than 0.1% by weight, the total volatile content other than the maleimide monomer is not greater than 0.5% by weight, the ratio Mw/Mn for the weight average molecular weight Mw and the number average molecular weight Mn is not greater than 3, the yellow index is not greater than 30 and the intrinsic viscosity is from 0.3 to 1.5.

The rubber-reinforced resin (B) used in the present invention is prepared by polymerizing at least one monomer selected from the group consisting of vinyl cyanide compounds, aromatic vinyl compounds and alkyl (meth)acrylates with 1 to 8 carbon atoms in the alkyl group under the presence of a butadiene rubber. Exemplary butadiene rubbers are polybutadiene, butadiene-styrene copolymer rubber and butadiene-acrylonitrile copolymer (both copolymers mainly comprise butadiene), having glass transition temperature of not higher than 0° C. As specific examples of the vinyl cyanide compound, there can be mentioned acrylonitrile, methacrylonitrile and fumaronitrile, with acrylonitrile being preferred. As specific examples of the aromatic vinyl compound, there can be mentioned styrene, α-methylstyrene, t-butylstyrene, chlorostyrene, bromostyrene and vinyltolune, with styrene, α-methylstyrene being preferred. Further, as specific examples of the alkyl (meth)acrylate with 1 to 8 carbon atoms in the alkyl group, there can be mentioned methyl (meth)acrylate, ethyl (meth)acrylate, propyl (meth)acrylate, butyl (meth)acrylate and 2-ethylhexyl (meth)acrylate, with methyl (meth)acrylate being preferred. The content of the butadiene rubber in the rubber-reinforced resin (B) is preferably from 30 to 85% by weight. As the method of polymerizing at least one monomer described above in the presence of the butadiene rubber, there can be used those various polymerization processes such as emulsion polymerization, bulk polymerization, suspension polymerization, solution polymerization, emulsion-suspension polymerization and emulsion-bulk polymerization, with the emulsion polymerization process being used preferably.

As other rigid thermoplastic resin (C) than the maleimide copolymer (A) and the rubber reinforced resin (B) used as the optional ingredient in the present invention, there can be mentioned acrylonitrile-styrene copolymer (AS resin), α-methylstyrene-acrylonitrile copolymer (uSAN), polymethyl methacrylate (PMMA) and methyl methacrylate-styrene copolymer (MS resin).

In the resin composition according to the present invention, the maleimide copolymer (A) and the rubber-reinforced resin (B) are blended within a range from 5 to 95 parts by weight of the former and from 95 to 5 parts by weight of the latter, with the total amount of the copolymer (A) and the resin (B) being 100 parts by weight. If the amount of the rubber-reinforced resin (B) to be blended is not greater than 5 parts by weight, it may sometime result in a resin composition having unsatisfactorily low impact strength. Further, the amount in excess of 95 parts by weight is not preferred since the heat resistance of the resultant resin composition can not be improved.

The amount of the other rigid thermoplastic resin (C) is within a range from 0 to 300 parts by weight based on 100 parts by weight of the total amount of the copolymer (A) and the resin (B) as described above. With the amount of the thermoplastic resin (C) in excess of 300 parts by weight, no improvement can be expected for the heat resistance and impact resistance of the finally obtained resin composition.

In a resin composition according to the present invention, it is possible to additionally blend a hindered phenol antioxidant or phosphite stabilizer with an aim of improving the heat stability, benzophenone UV-ray absorber, hindered amine stabilizer or benzotriazole UV-ray absorber with an aim of improving the weather proofness, and amide type lubricant such as ethylene bisstearylamide or metal soap with an aim of improving the moldability, either alone or in combination. Further, it is also possible to blend a flame retardant to obtain a flame retardant resin composition.

The resin composition according to the present invention can be utilized in various fields of molding or forming such as injection molding, extrusion molding and vacuum forming. Also, the molding products can be applied with lustering treatment such as plating vacuum-vapor deposition and sputtering,.

EXAMPLE

The present invention will now be described in further detail with reference to examples. It is understood that the present invention is by no means restricted by such specific examples as these examples are only for the purpose of illustration and are not intended to be limitative. In the examples, "parts" means "parts by weight". Further, various methods for measuring properties of copolymers and resin compositions were conducted by the following methods.

The amount of polymer in the solution of polymerization reaction is determined by diluting the solution with methyl ethyl ketone, re-precipitating the polymer with methanol and calculating the amount based on the weight of the resultant polymer. The re-precipitated polymer was used for the analysis of chemical composition, measurement for intrinsic viscosity and GPC measurement of the polymer.

The amount of the unreacted monomer in the solution of polymerization reaction and the residual monomer after devolatization were measured by gas chromatography.

The chemical composition of the polymer in terms of each of the monomer units was calculated based on the absorption assigned to each of the characteristic groups in IR absorption spectroscopy.

The intrinsic viscosity ($\eta$) of the polymer was determined by dissolving the polymer in N,N-dimethylformamide and measuring at 25° C. by Ubbellohde's viscometer.

The ratio Mw/Mn for the weight average molecular weight (Mw) and the number average molecular weight (Mn) of the polymer was determined based on the ratio of Mw and Mn calculated from the extraction curve of GPC based on the standard polystyrene polymer.

The melt flow index (MI) was determined as the discharged amount (g) for 10 min at 220° C. or 230° C. under each of the loads of 10 kg according to ASTM D-1238.

Further, by using test specimens molded from the polymer by a 1-ounce injection molder at a cylinder temperature of 260° C., Izod impact strength, Rockwell hardness, Vicat softening temperature, Yellow index (YI) and total light transmittance were measured by the following methods:

| | |
|---|---|
| Izod impact strength: | ASTM D-256 (with notched ¼" rod) |
| Rockwell hardness: | ASTM D-785 (unit: M scale) |
| Vicat softening temperature: | ASTM D-1525 (5 kg load) |
| Yellow index (YI): | ASTM D-1925 (measured for molded plate of 3 mm thickness) |
| Total light transmittance: | ASTM D-1003 (measured for molded plate of 3 mm thickness) |
| Heat decomposability: | A plate of 50 × 80 × 3 mm was molded by using one ounce injection molder at 300° C. and judgement was made depending on the number of silver streaks developed at the surface thereof according to the following standards: ◯: silver streak none Δ: silver streak developed by 1-10 X: silver streak developed by more than 10 |

REFERENCE EXAMPLE 1

Preparation of maleimide copolymers (A-1-A-7)

Various kinds of maleimide copolymers (A-1-A-7) were prepared by using an apparatus as shown in the drawing.

At first, air in the first polymerization reactor (stirred tank reactor) 1 was removed by means of a vacuum pump and then nitrogen gas was introduced into the reactor to form a nitrogen atmosphere. The procedure was repeated again to form a complete nitrogen atmosphere in the reactor and then polymerization was conducted.

That is, continuous operation was conducted by continuously supplying dropwise various kinds of solution mixture A and solution mixture B each at a ratio shown in Table 1 from respective pipeways into the first polymerization reactor 1, conducting the copolymerization under the conditions of polymerization temperature and residence time shown in Table 1, and continuously recovering the product in an amount equal to the total amount of the monomers and the solvent supplied when the conversion ratio reached the value each shown in Table 1. The solution flowing out of the first polymerization reactor 1 was transferred by means of a gear pump 2 to an extrusion flow type second polymerization reactor 3. In the second reactor 3, polymerization was further progressed to remarkably reduce the amount of the residual maleimide monomer. Subsequently, the product was supplied from the second reactor 3 by way of the gear pump 4 to a devolatizing extruder 5. The compositions of the solution at the exit of the second polymerization reactor 3 are shown in Table 2. The devolatizing extruder used in this case was a 2-Vent ($V_1$ and $V_2$ in the drawing) type twine-screw extruder. After separating the residual monomer and the organic solvent from the polymer in the devolatizing extruder 5, polymer was pelletized in a pelletizer 6 to obtain transparent pellets. Table 3 shows the operation conditions for the devolatizing extruder 5, as well as the contents for the residues and chemical composition of the maleimide copolymers. Table 4 shows various physical properties for thus obtained maleimide copolymers (A-1-A-7).

REFERENCE EXAMPLE 2

Preparation of maleimide copolymer (A-8) by emulsion polymerization

The following ingredients were charged into a 5 liter glass reactor equipped with a stirrer.

| | |
|---|---|
| Deionized water | 200 parts |
| Sodium dodecylbenzene sulfonate | 2 parts |
| Rongalite | 0.5 parts |
| Ferrous sulfate | 0.005 parts |
| Disodium ethylenediamine tetraacetate | 0.01 part |

The charged ingredients were heated to 60° C. and, the liquid mixture of the following composition was continuously dropped for 3 hours while maintaining internal temperature of the reactor at 60° C. After completion of the dropping, the mixture was maintained at 60° C. for one hour and then cooled.

| | |
|---|---|
| Acrylonitrile | 15 parts |
| Styrene | 55 parts |
| N-phenylmaleimide | 30 parts |
| Cumene hydroperoxide | 0.5 parts |

The resultant maleimide copolymer latex was coagulated with magnesium sulfate, dehydrated and then dried to obtain a maleimide copolymer (A-8) as white powder. The results of measuring chemical composition and physical properties of the maleimide copolymer (A-8) are shown in Tables 3 and 4, respectively.

REFERENCE EXAMPLE 3

Preparation of rubber-reinforced resin (B)

The following ingredients were charged in a polymerization reactor.

| | |
|---|---|
| Polybutadiene latex (as solid) | 60 parts |
| Deionized water | 140 parts |
| Dextrose | 0.6 parts |
| Sodium pyrophosphate | 0.3 parts |
| Ferrous sulfate | 0.002 parts |
| Potassium rosinate | 1 part |

The charged ingredients were heated to 60° C., to which a liquid mixture comprising 12 parts of acrylonitrile, 28 parts of styrene, 0.2 parts of cumene hydroperoxide, 0.5 parts of tertiary dodecyl mercaptan was continuously dropped over 2 hours. After the completion of the dropping, the mixture was further aged for 2 hours to complete the polymerization. 0.5 g of 2,6-di-tertiary-butyl-p-cresol (BHT) was added to the resultant polybutadiene rubber-reinforced resin latex, sufficiently mixed, coagulated with diluted sulfuric acid, dewatered and dried to obtain polybutadiene rubber-reinforced resin (B) as white powder.

EXAMPLE 1-5, COMPARATIVE EXAMPLES 1-4

To each 100 parts of blends prepared by blending one of the maleimide copolymers (A-1-A-8) prepared in Reference Examples 1-2, the polybutadiene rubber-reinforced resin (B) prepared in Reference Example 3 and AS resin comprising from 30% by weight of acrylonitrile unit and 70% by weight of styrene unit prepared by a conventional suspension polymerization process each at a ratio shown in Table 5, 0.2 parts of a phenol antioxidant as a stabilizer (Antage W-400, trade name of products manufactured by Kawaguchi Kagaku Co.) and 0.4 parts of phosphite stabilizer (Mark C, trade name of products manufactured by Adeca Argus Co.) were added and sufficiently mixed and then each of the blends was pelletized by a 30 mmΦ twine-screw extruder at 280° C. The basic physical properties of the resultant pellets and the result of the evaluation for the YI and heat decomposability of the molding plate are also shown in Table 5.

As apparent from the result of Table 5, in Comparative Example 1, the heat resistance of the resin composition containing the rubber-reinforced resin (B) was somewhat lower as compared with those in Examples, since the content of N-phenylmaleimide in the maleimide copolymer was low and the heat resistance of the copolymer was poor.

In Comparative Example 2, since the intrinsic viscosity ($\eta$) and the Izod impact strength of the maleimide copolymer were low, the resin composition containing the rubber-reinforced resin (B) showed lower value for the Izod impact strength.

In Comparative Example 3, since the value for Mw/Mn of the maleimide copolymer was as high as 3.5, the Izod impact strength of the copolymer and the resin composition containing the rubber-reinforced resin (B) had also poor Izod impact strength although it had a high heat resistance.

In Comparative Example 4, since the maleimide copolymer (A-8) which was not subjected to treatment for devolatization of the remaining monomers, there was much residual volatile component in the maleimide copolymer. Therefore, the resin composition containing the rubber-reinforced resin (B) showed poor heat resistance as compared with that in Example 1 although the content of N-phenylmaleimide unit in the maleimide copolymer was high. Since the amount of residual N-phenylmaleimide amount in the copolymer was high, YI was high and the development of the silver streaks was remarkable in respect to the resin composition.

TABLE 1

| Maleimide copolymer (A) | Composition of liquid mixture for copolymerization: Liquid mixture A (part): N-phenyl-maleimide | Styrene | Methyl-methcrylate | Acrylo-nitrile | Liquid mixture B (part): Methyl ethyl ketone | Polymerization initiator* | Polymerization temperature (°C.) | Residence time (hr) | Conversion ratio in first polymerization reactor |
|---|---|---|---|---|---|---|---|---|---|
| (A-1) | 17 | 39 | — | 14 | 30 | 0.07 | 100 | 1 | 55 |
| (A-2) | 10 | 50 | — | 10 | 30 | 0.07 | 100 | 1 | 38 |
| (A-3) | 15 | 55 | — | — | 30 | 0.1 | 100 | 1 | 46 |
| (A-4) | 10 | 46 | 14 | — | 30 | 0.1 | 100 | 1 | 40 |
| (A-5) | 7 | 42 | — | 21 | 30 | 0.1 | 100 | 1 | 41 |
| (A-6) | 14 | 42 | — | 14 | 30 | 0.07 | 100 | 1.5 | 50 |
| (A-7) | 14 | 42 | — | 14 | 30 | 0.07 | 100 | 1.5 | 50 |

*Polymerization initiator: 1,1-dibutylperoxy-3,3,5-trimethylcyclohexane

TABLE 2

| Kind of maleimide copolymer (A) | Composition of solution at the exit of second polymerization reactor (wt %): N-phenyl-maleimide | Styrene | Methyl-metha-crylate | Acrylo-nitrile | Methyl ethyl ketone | Maleimide copolymer |
|---|---|---|---|---|---|---|
| (A-1) | 0.4 | 15.8 | — | 9.8 | 30 | 40 |
| (A-2) | 0.4 | 30 | — | 7.6 | 30 | 32 |
| (A-3) | 0.1 | 31.9 | — | — | 30 | 38 |
| (A-4) | 0.5 | 26.1 | 11.4 | — | 30 | 32 |
| (A-5) | 0.1 | 20.9 | — | 14 | 30 | 35 |
| (A-6) | 0.4 | 19.8 | — | 9.8 | 30 | 40 |
| (A-7)** | — | — | — | — | — | — |

**(A-7) was not passed through the second polymerization reactor

TABLE 3

| Maleimide copolymer (A) | Barrel temperature (°C.) | Vacuum degree in vent (Torr) | | Residue (wt %) | | Monomer unit content in maleimide copolymer (wt %) | | | |
|---|---|---|---|---|---|---|---|---|---|
| | | $V_1$ | $V_2$ | N-phenylmaleimide | Total volatile content*** | N-phenylmaleimide | Styrene | Methylmethacrylate | Acrylonitrile |
| (A-1) | 250 | 260 | 20 | 0.018 | 0.15 | 40 | 52 | — | 8 |
| (A-2) | 250 | 260 | 20 | 0.005 | 0.35 | 30 | 63 | — | 7 |
| (A-3) | 250 | 260 | 20 | <0.001 | 0.45 | 40 | 60 | — | — |
| (A-4) | 250 | 260 | 20 | 0.02 | 0.48 | 30 | 62 | 8 | — |
| (A-5) | 250 | 260 | 20 | <0.001 | 0.17 | 20 | 60 | — | 20 |
| (A-6) | 250 | 260 | 20 | 0.001 | 0.20 | 35 | 55 | — | 10 |
| (A-7) | 250 | 260 | 760 | 0.5 | 3.45 | 38 | 54 | — | 8 |
| (A-8) | — | — | — | — | — | 31 | 54 | — | 15 |

***Total of the residual monomer other than N-phenylmaleimide and the organic solvent

TABLE 4

| Maleimide copolymer (A) | Basic physical property: Izod impact strength (kg · cm/cm) | MI (230° C., 10 kg load) (g/10 min) | Rockwell hardness (M scale) | Vicat softening temperature (5 kg load) | [η] | Mw/Mn | YI | Total light transmittance (%) |
|---|---|---|---|---|---|---|---|---|
| (A-1) | 2 | 0.26 | 99.9 | 158.7 | 0.8 | 2.1 | 15.2 | 88.5 |
| (A-2) | 3 | 0.82 | 94.2 | 143.0 | 0.82 | 2.0 | 12.5 | 89.2 |
| (A-3) | 1.8 | 0.8 | 96 | 156.5 | 0.5 | 2.3 | 9.0 | 80.1 |
| (A-4) | 2.1 | 0.78 | 96.1 | 141.5 | 0.78 | 2.2 | 8.1 | 90.3 |
| (A-5) | 2.3 | 6.1 | 92.1 | 135 | 0.71 | 1.9 | 11.1 | 90.0 |
| (A-6) | 0.8 | 4.5 | 97.3 | 152 | 0.28 | 2.3 | 14.1 | 89.0 |
| (A-7) | 2.3 | 1.2 | 97.2 | 131 | 0.81 | 2.1 | 35.0 | 78.6 |
| (A-8) | 1.5 | 1.48 | 90.3 | 135.8 | 0.75 | 3.5 | 42.0 | 77.7 |

TABLE 5

| | Maleimide copolymer (A) (part) | | | | | | | | Rubber-reinforced resin (B) | AS resin | Basic physical property | |
|---|---|---|---|---|---|---|---|---|---|---|---|---|
| | (A-1) | (A-2) | (A-3) | (A-4) | (A-5) | (A-6) | (A-7) | (A-8) | (part) | (part) | Izod impact strength (kg · cm/cm) | MI (220° C., 10 kg load) (g/10 min) |
| Example 1 | 75 | — | — | — | — | — | — | — | 25 | — | 9.8 | 0.2 |
| Example 2 | — | 75 | — | — | — | — | — | — | 25 | — | 14.7 | 0.72 |
| Example 3 | 55 | — | — | — | — | — | — | — | 25 | 20 | 15.8 | 0.85 |
| Example 4 | — | — | 55 | — | — | — | — | — | 25 | 20 | 13.9 | 1.03 |
| Example 5 | — | — | — | 75 | — | — | — | — | 25 | — | 11 | 0.71 |
| Comparative Example 1 | — | — | — | — | 75 | — | — | — | 25 | — | 17 | 2.81 |
| Comparative Example 2 | — | — | — | — | — | 75 | — | — | 25 | — | 4.8 | 1.45 |
| Comparative Example 3 | — | — | — | — | — | — | 75 | — | 25 | — | 10.2 | 1.08 |
| Comparative Example 4 | — | — | — | — | — | — | — | 75 | 25 | — | 7.2 | 1.25 |

| | Basic physical property: Rockwell hardness (M scale) | Vicat softening temperature (5 kg load) (°C.) | YI | Heat decomposability (silver streak) |
|---|---|---|---|---|
| Example 1 | 111.5 | 146.6 | 28.5 | ○ |
| Example 2 | 109.2 | 133.0 | 26.1 | ○ |
| Example 3 | 110.3 | 133.8 | 23.2 | ○ |
| Example 4 | 108.9 | 130.6 | 18.3 | ○ |
| Example 5 | 108.4 | 132.3 | 15.4 | ○ |
| Comparative Example 1 | 109.1 | 126.8 | 24.3 | ○ |
| Comparative Example 2 | 110.8 | 140.3 | 27.9 | ○ |
| Comparative Example 3 | 109.4 | 132.4 | 50.9 | X |
| Comparative Example 4 | 108.1 | 127.6 | 63.5 | ○ |

We claim:

1. A heat resistant and impact resistant resin composition comprising from 5 to 95 parts by weight of a maleimide copolymer (A), from 5 to 95 parts by weight of a rubber-reinforced resin (B), and from 0 to 300 parts by weight of another rigid thermoplastic resin (C) based on 100 parts by weight of the total amount of (A) and (B); the maleimide copolymer (A) comprising more than 28% by weight and not more than 65% by weight of a maleimide monomer unit (a), not less than 16% by weight and less than 72% by weight of at least one monomer unit (b) selected from the group consisting of aromatic vinyl compounds and methacrylic acid esters and from 0 to 25% by weight of other vinyl monomer unit (c) (in which the total amount of the monomer units (a)-(c) is 100% by weight), the maleimide copolymer (A) being prepared by continuous polymerization in an organic solvent, wherein (i) the content of the residual maleimide monomer in said copolymer is not greater than 0.1% by weight and the total volatile component other than the maleimide monomer in said copolymer is not greater than 0.5% by weight, (ii) the ratio Mw/Mn of the weight average molecular weight Mw and the number average molecular weight Mn of said copolymer is not greater than 3, (iii) the yellow index of said copolymer is not greater than 30, and (iv) the intrinsic viscosity of said copolymer is from 0.3 to 1.5; and the rubber-reinforced resin (B) being prepared by polymerizing at least one monomer selected form the group consisting of vinyl cyanide compounds, aromatic vinyl compounds and (meth)acrylates with 1 to 8 carbon atoms in the alkyl group in the presence of a butadiene rubber.

2. The heat resistant and impact resistant resin composition as claimed in claim 1, wherein the maleimide copolymer (A) comprises more than 28% by weight and not more than 55% by weight of a maleimide monomer unit (a), not less than 29% by weight and less than 72% by weight of at least one monomer unit (b) selected from the group consisting of aromatic vinyl compounds and methacrylic acid esters, and from 0 to 19% by weight of other vinyl monomer unit (c) (in which the total amount of the monomer units (a)-(c) is 100% by weight).

3. The heat resistant and impact resistant resin composition as claimed in claim 1, wherein the rubber-reinforced resin (B) contains from 30% to 85% by weight of a butadiene rubber.

4. The heat resistant and impact resistant resin composition as claimed in claim 1, wherein the resin composition has an Izod impact strength of from 9 to 16 kg.cm/cm and a YI value of from 15 to 29.

* * * * *